United States Patent Office 3,202,716
Patented Aug. 24, 1965

3,202,716
MONOMERIC DERIVATIVES OF 2,4-DIHYDROXY-BENZOPHENONE
Albert I. Goldberg, Berkeley Heights, N.J., and Martin Skoultchi and Joseph Fertig, New York, N.Y., assignors to National Starch and Chemical Corporation, New York, N.Y., a corporation of Delaware
No Drawing. Filed Oct. 22, 1964, Ser. No. 405,864
7 Claims. (Cl. 260—591)

This application is a continuation-in-part of our copending application, Serial No. 202,984, filed June 18, 1962 now abandoned.

This invention relates to a simple, one-step procedure for the preparation of ethylenically unsaturated derivatives of 2-4-dihydroxybenzophenone as well as to the novel derivatives thus prepared.

U.S. Patent 2,962,533, Hardy et al., relates to the preparation of ethylenically unsaturated 2,2'-dihydroxybenzophenones having at least one para position substituted by an alkylenoxy or an alkylenoxyalkoxy group. These derivatives may be prepared by several procedures including the selective alkenylation of the requisite polyhydroxybenzophenone with either an alkenyl halide or an acetylenic compound, or, by the preparation of a halogen substituted alkoxybenzophenone followed by alkali treatment. Although the particular monomeric benzophenone derivatives described in this patent offer an effective means of preparing copolymers having built-in resistance to ultra-violet radiation, the complexity of the aforedescribed reaction procedures would appear to preclude their widespread commercial utilization. Each of these various synthetic routes is thus seen to involve at least two distinct operations which include the initial reaction followed by a series of complex and time consuming extraction and separation procedures. Needless to say, a simpler, more direct method of preparing derivatives of this type would be highly desirable.

It is the prime object of this invention to produce a novel class of ethylenically unsaturated derivatives of 2,4-dihydroxybenzophenone by means of a simple, one-step procedure, said derivatives being capable of undergoing vinyl type polymerization reactions either alone or in the presence of other vinyl type comonomers. A further object of this invention involves the preparation of polymerizable derivatives of 2,4-di-hydroxybenzophenone which can be incorporated into a wide variety of polymers and copolymers so as to provide such polymers with improved heat, and more particularly, with improved light stability.

The novel compositions of our invention are the ethylenically unsaturated derivatives of 2-4-dihydroxybenzophenone corresponding to the formulae:

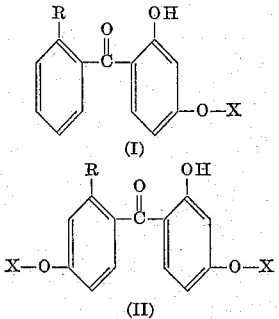

wherein X is a radical selected from among the group consisting of the (3-allyloxy-2-hydroxy)propyl, i.e.

$$-CH_2-CH-CH_2-O-CH_2-CH=CH_2$$
$$\phantom{-CH_2-}OH$$

and the (3-hydroxy)butenyl-1, i.e.

$$-CH_2-CH-CH=CH_2$$
$$\phantom{-CH_2-}OH$$

radicals and wherein R represents a radical selected from among the class consisting of hydrogen and hydroxy-gen and hydroxy radicals.

As representative of the 2,4-dihydroxybenzophenone derivatives of our invention, one may list the 4-(3-hydroxy)butenyl-1 ether of 2,4-dihydroxybenzophenone; the 4-(3-hydroxy)butenyl - 1 ether 2,2',4 - trihydroxybenzophenone; the 4,4'-di[(3-hydroxy)butenyl-1] ether of 2,2', 4,4'-tetrahydroxybenzophenone; the 4-(3-allyloxy-2-hydroxy)propyl ether of 2,4-dihydroxybenzophenone; 4-(3-allyloxy-2-hydroxy)propyl ether of 2,2',4-trihydroxybenzophenone; the 4,4'-di(3-allyloxy-2-hydroxy)propyl ether of 2,2',4,4'-tetrahydroxybenzophenone.

Thus, it is to be seen that the derivatives of our invention may be described as mono- and difunctional ethylenically unsaturated derivatives of 2,4-dihydroxybenzophenone; or, more specifically, as the mono- and di-(3-hydroxy)butenyl-1 and mono- and di-(3-allyloxy-2-hydroxy)propyl ethers of 2,4 - dihydroxybenzophenone wherein said (3-hydroxy)butenyl-1 and (3-allyloxy-2-hydroxy)propyl ether groups are substituted upon the 4 or on the 4 and 4' positions of the benzophenone nucleus. All of these derivatives have and will continue, for purposes of brevity, to be referred to as the ethylenically unsaturated derivatives of 2,4-dihydroxybenzophenone since they can, in fact, all be considered as derivatives of this particular benzophenone compound.

All of the above listed compounds, as well as any others which may correspond to the above formulae, are materials which are capable of readily undergoing vinyl type polymerization reactions. They are thus useful for the preparation of homopolymers and, more particularly, for the preparation of copolymers with a wide variety of other vinyl type monomers. These copolymers are especially outstanding in regard to their superior light stability. This improved stability is imparted to these copolymers as a result of the presence therein of the 2,4-dihydroxybenzophenone moiety which is permanently bound into and inherently part of the resulting copolymer molecule as a result of the incorporation therein of the ethylenically unsaturated 2,4-dihydroxybenzophenone derivatives of our invention.

In brief, the synthesis of our novel derivatives is accomplished by means of a simple, one-step procedure involving the reaction of a 2,4-dihydroxybenzophenone intermediate together with either butadiene monoxide or allyl glycidyl ether in the presence of a quaternary ammonium halide catalyst. Thus, where butadiene monoxide is utilized, the resulting derivatives are the (3-hydroxy)butenyl-1 ethers of their respective 2,4-dihydroxybenzophenone intermediates; whereas, when allyl glycidyl ether is employed, the resulting derivatives are the (3-allyloxy-2-hydroxy)propyl ethers of their respective 2,4-dihydroxybenzophenone intermediates. Hereinafter, butadiene monoxide and allyl glycidyl ether will be referred to collectively, as "the ethylenically unsaturated reagents."

The 2,4-dihydroxybenzophenone intermediates which are applicable for use in the process of our invention are compounds corresponding to the following formula:

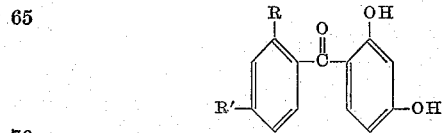

wherein R represents a radical selected from among the class consisting of hydrogen and hydroxy radicals and wherein R' represents a radical selected from among the class consisting of hydrogen and hydroxy radicals. It is to be noted at this point, that when R' in this formula is a hydroxy radical, the resulting derivative will be difunctional, i.e. it will contain two ethylenically unsaturated groups, and correspond to the above given Formula II which represents those derivatives of our invention which are difunctional in character. These difunctional derivatives thereby contain, as is seen, two ethylenically unsaturated side chains which are substituted on the 4 and 4' positions of the benzophenone nucleus. The subsequent use of the difunctional derivatives as comonomers in polymerization reactions may, if desired, result in the preparation of crosslinked copolymers, i.e. copolymers containing an interlaced, two dimensional structural network as opposed to uncrosslinked copolymers which are essentially linear and one dimensional in their configuration. Such crosslinked copolymers will, however, be produced only in those cases wherein the resulting copolymers have a high molecular weight. Thus, where desired, the practitioner may utilize these difunctional benzophenone derivatives of our invention as comonomers and nonetheless prepare non-crosslinked copolymers merely by conducting the polymerization under conditions which will lead to low molecular weight polymers.

As examples of the 2,4-dihydroxybenzophenone intermediates which may be utilized in our process, one may list:

2,4-dihydroxybenzophenone, i.e.

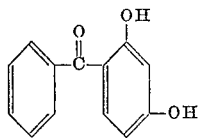

2,2',4,4'-tetrahydroxybenzophenone, i.e.

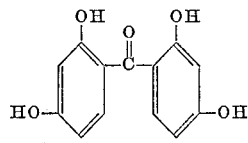

and, 2,2',4-trihydroxybenzophenono, i.e.

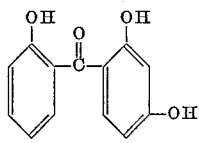

Hereinafter, it is to be understood that the use, for purposes of brevity, of the expression, "the 2,4-dihydroxybenzophenone intermediate" is meant to include any of the above listed intermediates as well as any others which may correspond to the above noted formula which was given to represent these intermediates.

In conducting the reaction which leads to the synthesis of our novel derivatives, one of the ethylenically unsaturated reagents, i.e. the butadiene monoxide or the allyl glycidyl ether, in a concentration amounting to a slight stoichiometric excess in the order of about 10 to 20% over the subsequently added 2,4-dihydroxybenzophenone intermediate, is first ordinarily admixed with the selected quanternary ammonium halide catalyst. The latter include substituted quaternary ammonium halides corresponding to the formula:

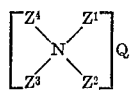

wherein Q is an ion selected from the group consisting of chloride, bromide, fluoride and iodide ions, and $Z^1$, $Z^2$, $Z^3$, and $Z^4$ are hydrocarbon radicals selected from the group consisting of alkyl, aryl and alkyl aryl radicals. Representative of the above described catalysts are tetramethylammonium chloride, tetramethylammonium bromide, tetraethylammonium bromide, tetrabutylammonium iodide, phenyltrimethylammonium chloride and benzyltrimethylammonium chloride. These catalysts should be present in a concentration of about 0.1 to 5.0%, as based upon the weight of the respective ethylenically unsaturated reagent.

Mention may be made at this point of the fact that in those cases wherein the 2,4-dihydroxybenzophenone intermediate being utilized is one having a hydroxy radical substituted on the 4' position of the benzophenone nucleus, e.g. 2,2',4,4',-tetrahydroxybenzophenone, it becomes necessary to use a concentration of the ethylenically unsaturated reagent amounting to slightly more than double the stoichiometric eqnivalent of the thus substituted 2,4-dihydroxybenzophenone intermediate. This increased concentration of the ethylenically unsaturated reagent is required inasmuch as the use of these particular intermediates leads, as noted earlier, to the preparation of difunctional derivatives which, as may be readily seen, require twice as much of the butadiene monoxide or the allyl glycidyl ether to be employed in their synthesis.

Following the initial preparation of the mixture comprising the quaternary ammonium halide catalyst and the ethylenically unsaturated reagent, there is then added, with continued agitation, the selected 2,4-dihydroxybenzophenone intermediate. It may thus be noted that the process of our invention is conducted in the absence of water. Moreover, it should be emphasized that the use of this particular sequence is not critical to the process of our invention and may be altered by the practitioner to suit his particular needs. (It is, in fact, possible to admix the reactants and the catalyst in any desired order.) In any event, following the complete admixture of the 2,4-dihydroxybenzophenone intermediate with the catalyst and the ethylenically unsaturated reagent, agitation is continued while the resulting reaction mixture is maintained at a temperature in the range of about 50 to 100° C., and preferably at about 80 to 90° C., for periods of about 6 to 8 hours. Under these conditions, the reaction between the 2,4-dihydroxybenzophenone and the ethylenically unsaturated reagent will ordinarily proceed to a conversion in the range of about 80 to 95°.

In general, it should be noted that the preparation of the derivatives of our invention may be conducted at any temperature which will be high enough to result in an adequate reaction rate but which will not be so high as to cause the spontaneous polymerization of the resulting ethylenically unsaturated 2,4-dihydroxybenzophenone derivative. In addition, the length of the reaction period will depend, for the most part, upon the specific 2,4-dihydroxybenzophenone intermediate which is being utilized. Thus, it is a matter of simple experience and judgement on the part of the practitioner to determine the precise combination of time and temperature which will be best suited for the synthesis of any of the novel benzophenone derivatives coming within the scope of our invention.

Upon the completion of the reaction and with subsequent cooling of the reaction vessel to room temperature, the resulting products will ordinarily be in the form of viscous oils. For most purposes, including any subsequent polymerization reactions, this crude derivative of 2,4-dihydroxybenzophenone can then be used without any further purification being necessary. However, where desired the relatively small amount of unreacted 2,4-dihydroyybenzophenone intermediate may be removed. Thus, such means as chromatographic separation techniques, as for example with the use of a silica gel column, have been found to yield a product which, by means of a saponification equivalent analysis will indicate a purity of close to 100%. Other separation techniques, such as alkaline or organic solvent extraction procedures, may also be used where so desired by the practitioner.

It is also possible, if so desired, to prepare the novel derivatives of our invention by reaction in an organic solvent medium. Under these conditions, the 2,4-dihydroxybenzophenone intermediate, the catalyst, and the ethylenically unsaturated reagent may all be dissolved in a non-reactive polar solvent, such as acetone, tetrahydrofuran, dimethylformamide, dimethylsulfoxide, methyl ethyl ketone, or butyl acetate. The resulting derivative is then recovered by distilling off the solvent whereupon the crude product is purified by means of the above noted techniques.

By virtue of its presence, the secondary hydroxy group provides the novel compounds of the invention with a degree of versatility as ultra-violet light absorbers which is lacking in the compounds of the prior art as exemplified by the compounds of Hardy et al. Thus, the presence of this additional functional group in applicants' compounds provides the practitioner with a means for changing their basic physical properties without effecting any alteration in their ability to absorb ultra-violet light or to function as vinyl type monomers.

For example, by reacting this secondary hydroxy group with a long chain fatty acid chloride, such as stearyl chloride, the resulting substituted monomeric, benzophenone derivatives are highly soluble, or compatible in non-polar media whereas prior to the latter reaction, the novel compounds of the invention do not possess such solubility characteristics. Of greater significance is the fact that the homo- and copolymers derived from the thus treated monomers still retain their solubility in non-polar media and can thus be readily blended with such non-polar plastics as polyethylene and polypropylene so as to provide compatible compositions wherein the ability of these novel derivatives to absorb ultra-violet radiation would be of much value.

Alternatively, the presence of these secondary hydroxy groups in these novel compounds was found, surprisingly, to allow for their being reacted with an aliphatic or aromatic cyclic anhydride such, for example, as maleic or phthalic anhydride. The latter reaction, which unexpectly has no effect upon the ethylenic unsaturation of the compounds of this invention, yields an acidic half-ester of these monomeric benzophenone derivatives which, upon neutralization with alkali, yields a fully water soluble product which is still polymerizable. In contrast, prior to this series of reactions, the novel derivatives of this invention are, of course, insoluble in water. Here again, the homo- and copolymers derived from the thus treated benzophenone derivatives retain this water solubility and, therefore, are readily formulated with the many polymers which are often utilized in the form of aqueous emulsions or solutions including, for example, polyvinyl acetate and the acrylate ester polymers.

As may be readily appreciated, this unexpected ability on the part of these novel derivatives to be further reacted in order to alter their physical characteristics by means of a simple chemical reaction is a fact of great significance. Obviously, there will be little use for a particular benzophenone compound which, even though it may be an excellent ultra-violet absorber, nonetheless lacks the desired degree of compatability to be formulated with a polymer so as to yield a mixture wherein it will be successfully retained for prolonged periods. Thus, their ability to be quickly and simply transformed from materials which are normally compatible only with polar solvents and plastics, into materials which display compatibity with either non-polar or aqueous media, is truly an obvious property which is developed in the novel compounds of this invention and which is seen to be lacking in the compounds disclosed by Hardy et al.

Thus, for example, although the benzophenone derivatives of Hardy et al. may have substituent hydroxy groups upon their respective molecules, it will be noted that these hydroxy groups are at all times directly attached to the benzophenone nucleus, on either the 2 or the 2 and 2' positions, rather than being upon a pendant side chain as is the case with the secondary hydroxy groups of the novel derivatives of this invention. Such directly attached hydroxy groups have been found, surprisingly, to be quite different, with respect to their reactivity, as compared with the secondary hydroxy groups of the compounds of the subject invention.

Thus, the hydroxy groups on the 2 and 2' positions of the benzophenone compounds of Hardy et al. are sterically hindered as a result of hydrogen bonding to the benzophenone nucleus and are, therefore, unable to react with a vast number of the reagents which readily react with the pendant secondary hydroxy groups of the novel derivatives of this invention. For example, as noted hereinabove, it was found, unexpectedly, that the compounds of this invention can be easily combined, at their secondary hydroxy groups, with an aliphatic or aromatic cyclic anhydride such, for example, as maleic or phthalic anhydride. The latter reaction is not, however, possible with the compounds of Hardy et al. and thereby serves to point out their inherent lack of versatility.

At the time the above noted copending application was filed, it was believed that equivalent results could be obtained in the preparation of the novel derivatives of this invention by the reaction of butadiene monoxide or allyl glycidyl ether with a 2,4-dihydroxybenzophenone intermediate by using, as a catalyst for the reaction, either a quaternary ammonium halide, an alkali metal hydroxide, or a salt of an alkali metal. However, subsequent to the filing of the latter application, it was found that, under identical reaction conditions, the use of quaternary ammonium halide catalyst provided results which were, in fact, far superior to the results which could be obtained when either alkali metal hydroxides or alkali metal salts were employed as catalysts for the latter reaction.

These improved results, which are derived from the use of quaternary ammonium halide catalysts, are indicated by a significantly higher reaction rate which, at any given temperature, leads to a far more rapid completion of the reaction while also achieving a percent conversion of the benzophenone intermediate to the desired derivative which is substantially higher than is capable of being attained, under the same reaction conditions, by the use as catalysts of either alkali metal hydroxides or salts of the alkali metals.

The following examples will further illustrate specific embodiments of this invention. In these examples, all parts given are by weight unless otherwise noted.

*Example I.*—This example illustrates the preparation of the 4-(3-hydroxy)butenyl-1 ether of 2,4-dihydroxybenzophenone, i.e.

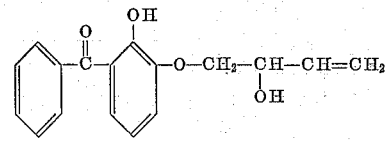

by means of the process of our invention.

An agitated mixture of 77.0 parts of butadiene monoxide, 214.0 parts 2,4-dihydroxybenzophenone and 2.8 parts of tetramethylammonium chloride was heated to a temperature in the range of 80–90° C. and maintained at this temperature for a period of five hours. Upon being cooled to 20° C., the resulting reaction product, which was in the form of a viscous oil, was removed and subjected to a base titration. The latter analysis revealed that there was about 4.3% of unreacted 2,4-dihydroxybenzophenone present within this reaction product which thereby indicates a conversion of 93% or a yield of about 264.0 parts of 4-(3-hydroxy)butenyl-1 ether of 2,4-dihydroxybenzophenone.

In repetitions of the latter procedure, comparable yields were obtained by the respective substitution of phenyltrimethylammonium chloride and benzyltrimethylammonium chloride for the above described tetramethylammonium chloride catalyst.

*Example II.*—This example illustrates the preparation of the 4-(3-allyloxy-2-hydroxy)propyl ether of 2,4-dihydroxybenzophenone, i.e.

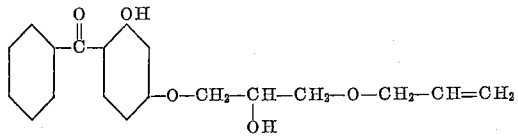

by means of the process of our invention.

An agitated mixture of 125.0 parts of allyl glycidyl ether, 214.0 parts of 2,4-dihydroxybenzophenone and 3.1 parts of tetraethylammonium bromide was heated to a temperature in the range of 80–90° C. and maintained at this temperature for a period of 5 hours. Upon being cooled to 20° C., the resulting reaction product, which was in the form of a viscous oil, was removed and subjected to a base titration. The latter analysis revealed that there was about 7% of unreacted 2,4-dihydroxybenzophenone present within this reaction product which thereby indicated a conversion of 80% or a yield of about 262.0 parts of the 4-(3-allyloxy-2-hydroxy) propyl ether of 2,4-dihydroxybenzophenone.

*Example III.*—The following table presents the pertinent data relating to the preparation of four additional ethylenically unsaturated benzophenone derivatives. In this table, derivatives No. 1 and 2 were prepared using 2,2′,4,4′-tetrahydroxybenzophenone as the 2,4-dihydroxybenzophenone intermediate while derivatives No. 3 and 4 were prepared using 2,2′,4-trihydroxybenzophenone as the 2,4-dihydroxybenzophenone intermediate. Moreover, derivatives No. 1 and 3 are (3-hydroxy)butenyl-1 ethers of their respective 2,4-dihydroxybenzophenone intermediates which were prepared by means of the procedure of Example I whereas derivatives No. 2 and 4 are (3-allyloxy-2-hydroxy)propyl ethers of their respective 2,4-dihydroxybenzophenone intermediates which were prepared by means of the procedure of Example II.

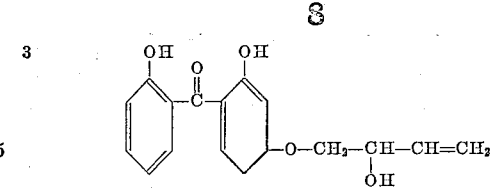

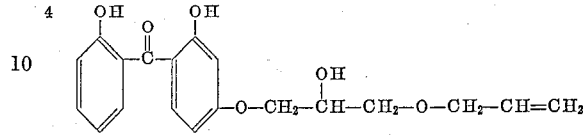

Summarizing, our invention is thus seen to provide the practitioner with a simple, direct method for preparing a novel class of ethylenically unsaturated derivatives of benzophenone. Variations may be made in proportions, procedures and materials without departing from the scope of this invention as defined in the following claims.

What is claimed is:

1. An ethylenically unsaturated derivative of 2,4-dihydroxybenzophenone selected from the group consisting of:

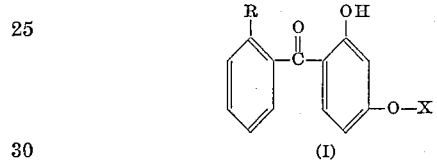

and

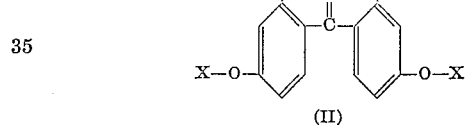

wherein X is an ethylenically unsaturated radical selected from the group consisting of (3-allyloxy-2-hydroxy)propyl and (3-hydroxy)butenyl-1 radicals and wherein R represents a radical selected from the class consisting of hydrogen and hydroxy radicals.

2. The 4-(3-hydroxy)butenyl-1 ether of 2,4-dihydroxybenzophenone.

| # | Name | Parts benzophenone intermediate | Parts butadiene monoxide | Parts allyl glycidyl ether | Percent conversion | Yield (parts by wt.) |
|---|------|---|---|---|---|---|
| 1 | 4,4′-di[(3-hydroxy)butenyl-1] ether of 2,2′,4,4′-tetrahydroxybenzophenone. | 246.0 | 154.0 | | 93 | 359 |
| 2 | 4,4′-di(3-allyloxy-2-hydroxy) propyl ether of 2,2′,4,4′-tetrahydroxybenzophenone. | 246.0 | | 250.0 | 75 | 366 |
| 3 | 4-(3-hydroxy)butenyl-1 ether of 2,2′,4-trihydroxybenzophenone. | 230.0 | 77.0 | | 91 | 273 |
| 4 | 4-(3-allyloxy-2-hydroxy) propyl ether of 2,2′,4-trihydroxybenzophenone. | 230.0 | | 125.0 | 82 | 282 |

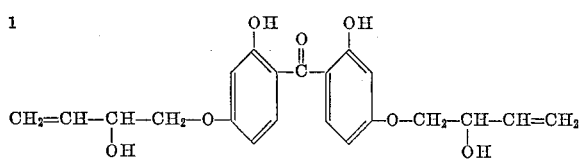

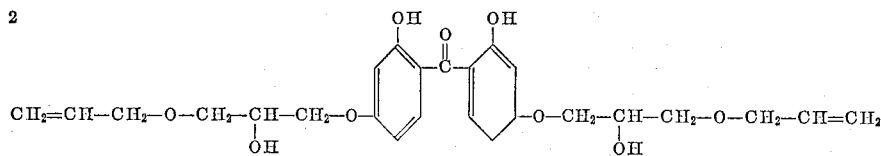

3. The 4-(3-hydroxy)butenyl-1 ether of 2,2′,4-trihydroxybenzophenone.

4. The 4,4′-di[(3-hydroxy)butenyl-1] ether of 2,2′,4,4′-tetrahydroxybenzophenone.

5. The 4-(3-allyloxy-2-hydroxy)propyl ether of 2,4-dihydroxybenzophenone.

6. The 4-(3-allyloxy-2-hydroxy)propyl ether of 2,2′,4-trihydroxybenzophenone.

7. The 4,4′-di(3-allyloxy-2-hydroxy)propyl ether of 2,2′,4,4′-tetrahydroxybenzophenone.

References Cited by the Examiner

UNITED STATES PATENTS 2,976,259 3/61 Hardy et al. _____ 260—591

OTHER REFERENCES

Yale et al.: J. Am. Chem. Soc., vol. 72, pp. 3710–16 (1950).

Stephenson: J. Am. Chem. Soc. (London), pp. 1571–77 (May 1954).

LEON ZITVER, *Primary Examiner.*